This invention relates generally to therapeutic equipment, and more particularly to a device of this type adapted for massaging the feet and legs of animals, and which involves a lightweight and simple structure which can be easily and quickly moved and put into use at any desired location.

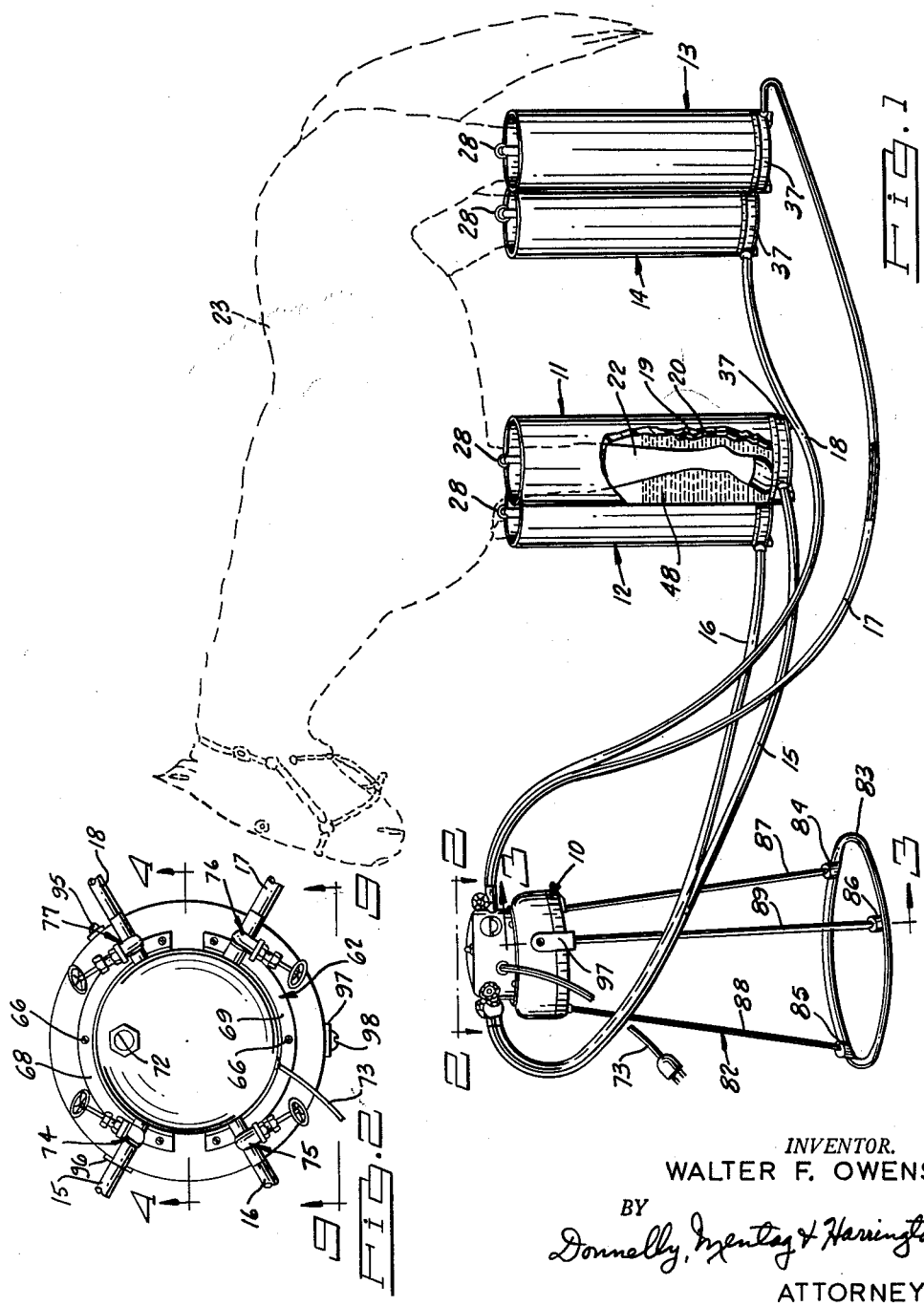

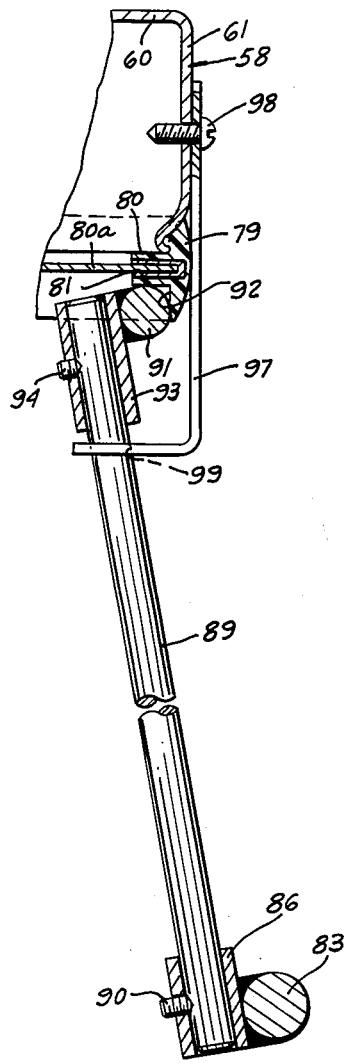
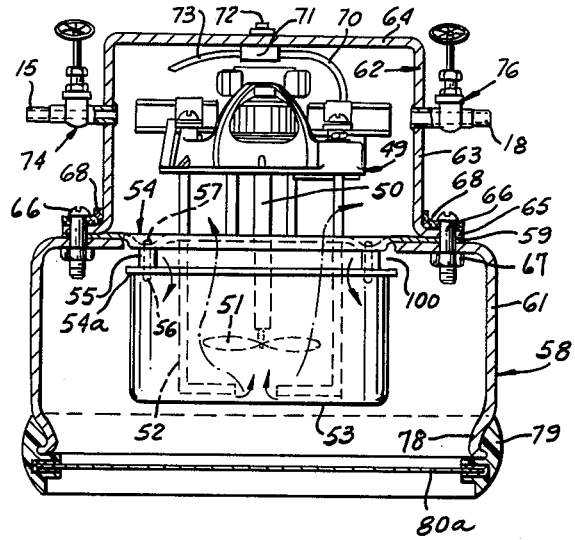
Fig. 4
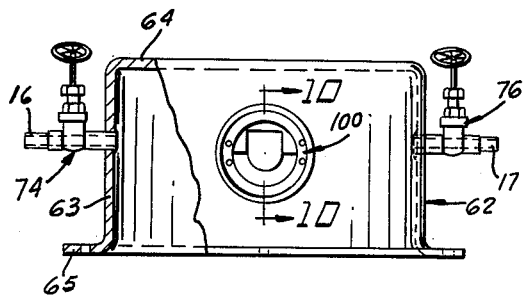
Fig. 9
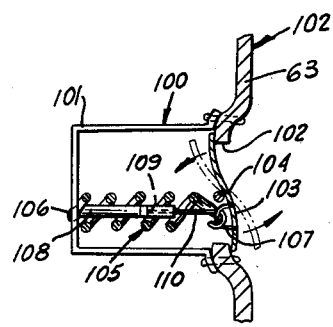
Fig. 3
Fig. 10
INVENTOR.
WALTER F. OWENS
BY
Donnelly, Mentag & Harrington
ATTORNEYS Nov. 3, 1964     W. F. OWENS     3,155,072
LIQUID MASSAGE TURBULATOR FOR CONDITIONING HORSES' LEGS
Filed Oct. 22, 1962     3 Sheets-Sheet 3
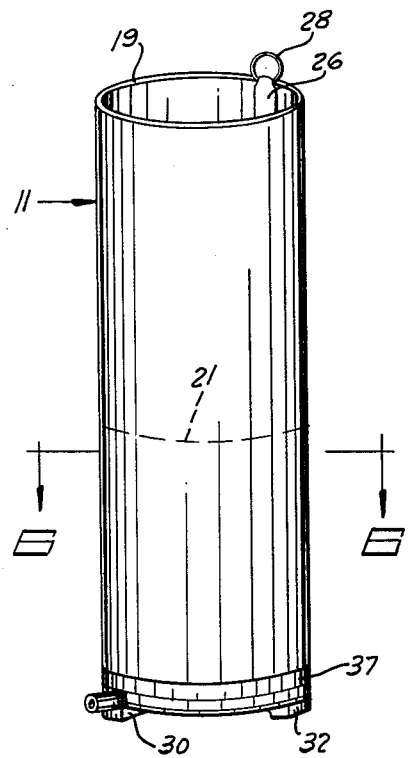
Fig. 5
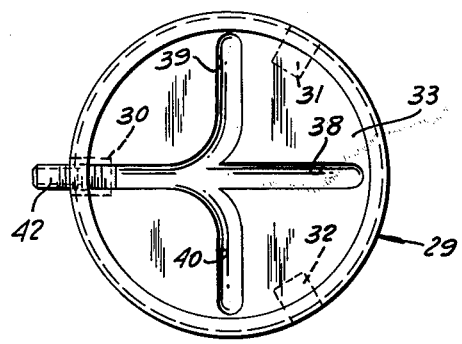
Fig. 7
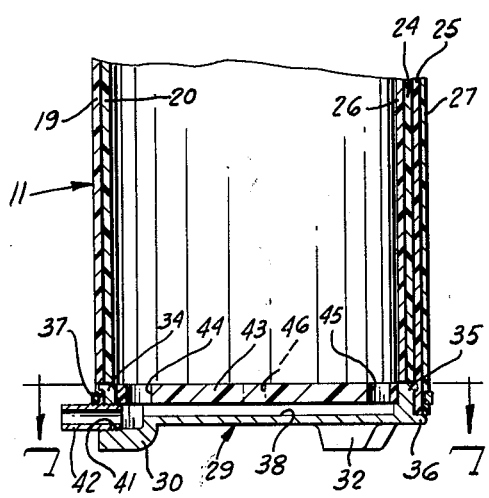
Fig. 8
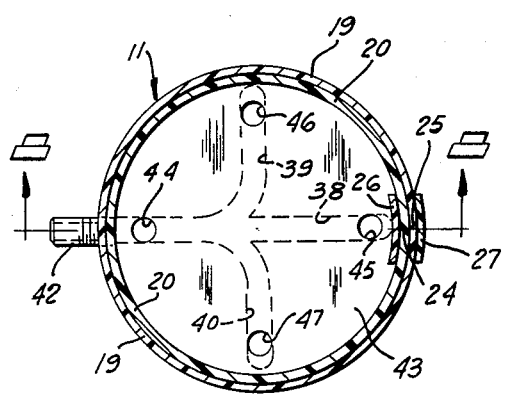
Fig. 6
*INVENTOR.*
WALTER F. OWENS
BY 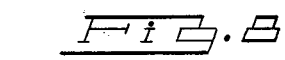
ATTORNEYS 3,155,072
LIQUID MASSAGE TURBULATOR FOR
CONDITIONING HORSES' LEGS
Walter F. Owens, 10157 Morley St., Detroit 4, Mich.
Filed Oct. 22, 1962, Ser. No. 232,080
3 Claims. (Cl. 119—1)

Animals of all kinds are subject to hoof and leg injuries and soreness. Horses that are used for racing, riding and other sporting events require constant and careful attention and conditioning to cure tired and strained tendons and muscles. It is well known that liquid massages have proved beneficial to horses in the curing of hoof and leg ailments. Many attempts have been made in the past to provide a suitable liquid massage apparatus for animals, but such prior art devices have proved to be heavy, cumbersome and costly. Accordingly, it is the primary object of the present invention to provide a novel and improved animal hydrotherapeutic device which is adapted to provide a positive liquid massage of the foot and leg of an animal while subjecting the same to a liquid bath which may be provided with medication if desired.

It is another object of the present invention to provide an animal hydrotherapeutic device which is simple and compact in construction, economical of manufacture, light in weight and portable, flexible in use and efficient in operation.

It is still another object of the present invention to provide an animal hydrotherapeutic device which includes a plurality of boots adapted to contain a liquid for bathing the hoof and leg of an animal and which liquid may or may not contain medication, said boot having an aluminum base which is provided with airways and a foot pad on said base with a plurality of holes therethrough for communication with the airways to permit air under pressure to be passed into the liquid bath for turbulating or agitating the same to permit the bubbles formed thereby to contact the animal leg surface to be treated as the bubbles rise to the surface of the liquid bath, and means connected to the airways in each of the boot bases for conducting air under pressure into said airways for agitating the liquid bath in each of the boots.

It is a still further object of the present invention to provide a novel and improved animal hydrotherapeutic device which includes a plurality of boots adapted to hold a liquid bath into which the legs of an animal are positioned, a portable and lightweight air motor disposed on a support at a position above the level of the liquid bath in the boots, fluid conduit means for conducting air under pressure from the air motor to each of the boots in a selective manner, and said air motor being provided with a thermostatic control for controlling the air temperature in said motor.

Other objects, features and advantages of this invention will be apparent from the following detailed description, appended claims, and the accompanying drawings.

In the drawings:

FIG. 1 is a perspective view of an illustrative embodiment of the invention, with parts broken away;

FIG. 2 is an enlarged top plan view of the structure illustrated in FIG. 1, taken along the line 2—2 thereof, with parts removed, and looking in the direction of the arrows;

FIG. 3 is an enlarged, fragmentary, broken, elevational section view of the structure illustrated in FIG. 1, taken along the line 3—3 thereof, and looking in the direction of the arrows;

FIG. 4 is an enlarged elevational sectional view of the structure illustrated in FIG. 2, taken along the line 4—4 thereof, and looking in the direction of the arrows;

FIG. 5 is a perspective view of one of the boots employed in the invention;

FIG. 6 is an enlarged horizontal sectional view of the structure illustrated in FIG. 5, taken along the line 6—6 thereof and looking in the direction of the arrows;

FIG. 7 is a top plan view of the aluminum base casting of the boots used in the present invention, taken along the line 7—7 thereof, and looking in the direction of the arrows, and with the foot pad removed;

FIG. 8 is a fragmentary elevational sectional view of the boot structure illustrated in FIG. 6, taken along the line 8—8 thereof and looking in the direction of the arrows;

FIG. 9 is an enlarged side elevational view, with parts broken away, of the motor dome assembly shown in FIG. 2, taken along the line 9—9 thereof and looking in the direction of the arrows; and, FIG. 10 is a fragmentary elevational sectional view of the thermostat structure illustrated in FIG. 9, taken along the line 10—10 thereof and looking in the direction of the arrows.

Referring now to the drawings and in particular to FIG. 1, the numeral 10 generally indicates an air motor means which is adapted to compress air and send it into the boots generally indicated by the numerals 11, 12, 13 and 14, by means of the flexible conduits or hoses 15, 16, 17 and 18, respectively. Each of the boots 11, 12, 13 and 14 is similarly constructed and the boot 11 will be described in detail and the corresponding parts of the other boots will be marked with similar reference numerals.

As shown in FIGS. 1 and 5 through 8, the boot 11 includes the cylindrical ball portion which is formed from a pair of telescopic circular members indicated by the numerals 19 and 20. The boot wall portions 19 and 20 are made from any suitable sheet rubber material. The outer boot wall portion 19 extends throughout the entire height of the boot while the boot inner wall portion 20 extends upwardly for approximately one-half the height of the boot from the base thereof and terminates at the point indicated by the numeral 21 in FIG. 5. The aforementioned boot construction provides a boot which is flexible on the upper end thereof for mounting over the leg 22 of a horse 23, as shown in FIG. 1. The lower portion 20 of the boot 11 provides rigidity to the boot to permit the same to maintain an upward vertical position without collapsing.

The boot outer wall portion 19 may be made from a piece of suitable rubber material having a size which is 30" high, 1/16" thick and 30⅛" in circumference. The boot section 20 would in such case be made from a suitable rubber material and be 16" high, 1/16" thick and approximately 28⅛" in circumference. As shown in FIG. 6, the ends of the sheet rubber material abut at the points indicated by the numerals 24 and 25. The abutting ends of the boot portions 19 and 20 are joined together by a vertically disposed strip of material 26 on the inside of the boot, and a similar strip of material 27 on the outside of the boot. The joint strips 26 and 27 for joining the abutting ends of the boot portions 19 and 20 together may be made from any suitable material and are secured to the wall portions 19 and 20 by any suitable rubber adhesive material. The joint strips 26 and 27 may be made from a sheet rubber and to a size of approximately 2″ in width and 1/16″ in thickness, and 30″ in length for strip 26, and 36″ in length for strip 27. As shown in FIG. 5, the upper ends of the strips 26 and 27 are connected together through the D ring 28 which is disposed on the upper edge of the boot wall section 19 for reception of a suitable hanger means for hanging the boot on a wall when not in use. When in use the boots 11, 12, 13 and 14 maintain an upright position because of the aforedescribed rigid boot wall structure.

As best seen in FIGS. 5 through 8, the boot 11 is provided with an aluminum base or casting generally indicated by the numeral 29. The base 29 is provided on the bottom end thereof with a plurality of downwardly extended, radially disposed legs 30, 31 and 32. The base 29 is provided with the horizontal wall 33 around the periphery of which is formed the upwardly extended flange 34. As shown in FIG. 8, the lower end of the inner boot wall portion 20 is adapted to be seated on top of the base flange 34. As best seen in FIG. 8, the base flange 34 is provided with a pair of vertically spaced apart, outwardly extended peripheral flanges 35 and 36. As shown in FIG. 8, the lower end of the outer boot wall portion 19 is adapted to be seated around the base flange 34 and it abuts against the upper side of the lower base flange 36. The outer joint strip 27 also extends down to the base flange 36.

As best seen in FIGS. 5 and 8, the lower end of the boot wall portion 19 is fixedly secured to the base flange 34 by means of a retainer metal strip 37, which is mounted around the boot wall portion 19 and is fixed in place by any suitable means. The strip 37 is preferably made from stainless steel or other suitable material. It will be understood that the boot wall portions 19 and 20 are not only secured together at the abutting ends thereof by the strips 26 and 27, but that they are also secured together at the abutting surface around the peripheries thereof by means of any suitable adhesive.

As shown in FIGS. 6, 7 and 8, a diametrically disposed recess or trough 38 is formed in the upper surface of the base wall 33, and this trough extends from one side of the base wall 33 to the other side thereof. As best seen in FIG. 7, a pair of radially disposed recesses or troughs 39 and 38 are also formed in the upper surface of the base wall 33 at right angles to the trough 38. The inner ends of the recesses 39 and 40 are connected to the recess 38, and the outer ends thereof extend to the outer sides of the base wall 33. It will be understood that the recesses 38, 39 and 40 provide air passages for conducting air under pressure into the boot 11.

As best seen in FIG. 8, the one end of the recess 38 extends outwardly through the base flange 34 to provide the threaded port 41 in which is threadably mounted a suitable pipe nipple as, for example, a 1½″ long ⅜″ pipe nipple. A rubber foot pad 43 is fixedly mounted in the boot on the upper surface of the base end wall 33 and is secured in place by any suitable adhesive. As shown in FIGS. 6 and 8, the rubber foot pad 43 is provided with a pair of holes 44 and 45 which communicate with the air recess or passageway 38, and a second pair of holes therethrough indicated by the numerals 46 and 47 which communicate with the air recesses or passageways 39 and 40, respectively. It will be seen that air entering the inlet pipe nipple 42 will be conducted through the passageways 38, 39 and 40 and thence through the ports or holes 44 to 47 and into the fluid 48 as shown in FIG. 1. Air under pressure entering through the last mentioned passageways and ports will turbulate or agitate the massage liquid 48 in the boot 11 and engage the surface of the horse's leg 22 while escaping upwardly to the atmosphere.

It will be understood that the boots 12, 13 and 14 are constructed in the same manner as the aforedescribed structure of boot 11. It will also be understood that the boot end of the hoses 15 through 19 are fixedly connected as shown in FIG. 1, by any suitable means, to the inlet pipe nipples 42 in each of the boots 11 through 14. As shown in FIG. 1, the horse's leg 22 is adapted to be disposed on the rubber pad 43 so that there is no metal to horse contact during the operation of the therapeutic device of the present invention. When the device is not in use the boots 11 through 14 may be hung on a suitable hanger on a wall by means of the rings 28. The hoses 15 through 18 may be stored inside of their respective boots when not in use. It will also be understood that the liquid 48 used in each of the boots may be the same in all of the boots, or it may be varied for each leg of the horse in accordance with the desires of the trainer, owner or veterinarian, and in accordance with the appropriate medication prescribed for each of the horse's legs. The massage solution in the boots can be removed after a massage operation and saved for future re-use.

The motor means 10 is illustrated in detail in FIG. 4 and comprises a suitable air motor indicated by the numeral 49. Any conventional air motor will suffice. A suitable motor of this type is one available on the market and made by the Lamb Electric Company of Kent, Ohio, and which produces four pounds of air pressure at a speed of 17,500 r.p.m. This Lamb Company motor is sold under Model No. IS 14750, and it is rated at 115 volts and 6.0 amperes. Motors of this type are shown in U.S. Patents Nos. 2,713,455, 2,748,301 and 2,786,624.

The motor 49 is provided with the usual drive shaft 50, and the impeller 51 which is mounted in the impeller housing 52. The impeller housing 52 is disposed in an outer housing 53 which is provided with the flange 54a. The housing 53 is connected to the annular mounting bracket 54 by means of a plurality of spacers 55, bolts 56 and nuts 57. The impeller housings 52 and 53 are adapted to be disposed within the air inlet housing or skirt generally indicated by the numeral 58, as shown in FIG. 4.

The annular mounting bracket 54 is provided with the annular peripheral flange 59 which is adapted to be seated on the flat inwardly extended circular flange 60 formed on the upper end of the integral cylindrical wall 61 of the skirt 58. The upper end of the motor 49 is enclosed by the dome 62 which includes the cylindrical wall 63, the integral horizontal top wall 64 and the outwardly extended flat flange 65. As shown in FIG. 4, the flange 65 is adapted to be seated on top of the mounting flange 59, and these two flanges are releasably secured to the skirt flange 60 by a plurality of bolts 66 and nuts 67. As shown in FIG. 2, two arcuate hold-down brackets 68 and 69 are mounted around the dome flange 65 and are seated on top thereof and are secured in place by the screws 66. As shown in FIG. 4, the electrical lead wires for the motor 49 are indicated by the numeral 70 and they are connected to the switch 71 which is fixedly mounted inside of the dome 62 on the inner side of the wall 64. The switch 71 may be any conventional push button switch having the button 72 which extends outwardly through the dome wall 64 for easy operation thereof. The power line 73 is adapted to be connected to any suitable source of 120 volt alternating current power. The line 73 passes through a suitable hole in the dome wall 63 and is connected to the switch 71 for selective energization of the motor 49.

The power line 73 is preferably a conventional three cable cord to provide for grounding of the electric motor 49. As best seen in FIG. 2, the dome 62 is provided with four, one-half inch gate valves indicated by the numerals 74, 75, 76 and 77. These gate valves may be of any suitable type and are connected to the flexible hoses 15 through 18, respectively.

As shown in FIGS. 3 and 4, the lower end of the skirt wall 61 is curved inwardly as indicated by the numeral 78, and seated in the outer curved surface of this portion is the circular rubber member 79. The rubber mounting member 79 is provided on the inner side thereof with the inwardly extended flange 80 in which is formed the horizontal slot 81. Fixedly mounted in the slot 81 by any suitable means is a screen 80a of any suitable type.

The motor means 10 is adapted to be supported by a suitable stand generally indicated by the numeral 82 so that it is disposed above the level of the fluid 48 in the boots 11 through 14. As shown in FIGS. 1 and 3, the stand 82 comprises the horizontal base ring 83 to which is fixedly secured, as by welding, the upwardly sloping tubular brackets 84, 85 and 86. Slidably mounted in each of the mounting brackets 84, 85 and 86 is the lower end of the inwardly and upwardly sloping rods 87, 88 and 89. These rods are secured in the brackets 84, 85 and 86 by any suitable means, as by means of set screws 90, as shown in FIG. 3. A second mounting ring 91 is seated within the square cornered recess 92 formed in the lower end of the rubber mounting brackets 79. Each of the supporting rods 87, 88 and 89 is provided with three tubular mounting brackets as 93, as shown in FIG. 3. These tubular brackets 93 are secured to the mounting ring 91 by any suitable means, as by welding. The upper ends of the mounting rods 87, 88 and 89 are slidably mounted in the upper mounting brackets 93 by any suitable means, as by means of set screws as 94.

The aforedescribed stand structure is secured to the motor skirt 58 by means of three L-shaped mounting brackets indicated by the numerals 95, 96 and 97, as shown in FIGS. 2 and 3. Each of these mounting brackets is constructed the same, and bracket 97 is illustrated in detail in FIG. 3. The vertical leg of the bracket 97 is secured to the wall 61 of the motor skirt 58 by means of the screw 98. The lower horizontal arm of the bracket 97 is provided with the hole 99 through which is passed the upper end of the mounting rod 89. It will be seen that the brackets 95, 96 and 97 hold the mounting stand to the motor means 10 so as to provide a light and portable motor and mounting stand combination.

When the motor is operated, it will be seen that air is drawn inwardly through the screen or filter 80a and that it passes upwardly and through the space 100 between the housing flange 54a and mounting bracket 54. The air then passes downwardly through housing 53 and into the impeller chamber 52 and it is then forced by the impeller 51 upwardly and into the dome 62. If the gate valves 74 through 77 are throttled down to a point where the air in the dome 62 is heated to an abnormal temperature, the thermostat, generally indicated by the numeral 100 in FIGS. 9 and 10, will be operated to permit the heated air to be exhausted to the atmosphere.

The thermostat 100 may be of any suitable conventional type. One type thermostat which may be used is shown in FIG. 10 and includes the U-shaped bracket 101 which is attached to the wall 63 of the dome 62 in a position straddling the opening 102. The opening 102 is normally closed by the circular gate 103 which is swingably mounted on the cross shaft 104 by any suitable means. The spring 105 has the rear end thereof abutting the U-shaped bracket 101 and is secured thereto as indicated by by the numeral 106. The spring 105 is under tension and has the outer end thereof secured to the gate 103 as indicated at the point 107. The spring is tensioned so that it creates an inwardly directed force on the gate 103 to maintain the gate in a closed position. Mounted within the spring is a conventional thermostatic expansion chamber 108 which is provided with the usual gases which expand under heat and which react against the piston 109 which is provided with the rod 110 that is suitably connected to the gate 103. As the gas in the chamber 108 is heated, it forces the rod 110 outwardly so as to open the gate 103 against the tension of the spring 105. The expansion chamber 108 would be suitably connected to the mounting bracket 101.

In use, the boots 11 through 14 are mounted on the legs of a horse to be treated with the device, and without any massage fluid in the boots. After the legs of the horse have been situated within the boots, the desired amount of massage liquid is poured into the boots together with the desired medicant. The operator may then open the valves 74 through 77 to permit the desired amount of air to be forced into the bottom of each of the boots through the aforedescribed air passageways to agitate or turbulate the fluid 48 in each of the boots. In use, it is the best procedure to have the aforementioned valves closed before starting the motor 49. Also, the prescribed procedure for turning off the apparatus is to close the air valves before turning off the motor 49. The motor means 10 is always maintained at a position above the liquid level 48 in the boot to prevent the liquid from draining back into the motor dome 62. When the hoses 15 through 18 are disconnected for storage purposes, they should be disconnected at the valve ends thereof so that the fluid in the boots may be drained through the hoses into containers to save the fluids for future re-use. It is only necessary to use enough fluid 48 to contact the leg area of the horse to be treated.

Actual experience has shown that the device of the present invention provides a useful and portable liquid massage for use on the legs of animals such as race horses, to provide quick and easy treatment for the same. A device of the present invention completely relaxes a high spirited horse after each workout or race. The muscles, tendons, nerves and blood vessels in the legs of the horse are massaged naturally. The nerves are relaxed and circulation is improved and the muscles and tendons are more supple after a treatment by a device of the present invention. It will be seen that there is no personal contact required while the liquid massager of the present invention is in operation, and that it is rugged in construction, simple of operation and flexible in application. The separate boots and air control valves provide a means whereby each leg of the horse may be provided with variable massaging actions by merely controlling the valve for each boot. The massage device of the present invention may be easily and simply stored when not in use.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. An animal hydrotherapeutic apparatus comprising:
    at least one flexible elongated boot having a length and cross section substantially conforming to the leg of an animal for holding a massage medicated liquid for massaging the leg of the animal inserted into the boot;
    a base on one end of said boot and having a hoof support and a plurality of air passages for conveying air under pressure into the massage liquid for turbulating the same; and
    an external horizontal inlet means connected intermediate the edge of said base for supplying air under pressure into said air passages below said boot.

2. An animal hydrotherapeutic apparatus according to claim 1 wherein said means for supplying air under pressure comprises an air motor, a stand for supporting said air motor in a position above the level of the massage liquid, at least one outlet valve connected to said air motor and a hose connecting said valve to the air passages in said base.

3. The combination according to claim 2 wherein said air motor includes a housing into which air is compressively pumped, a vent in the sidewall of said housing for venting the pressurized air to the atmosphere and thermostat means for opening said vent in response to the temperature of the compressed air.

References Cited by the Examiner

UNITED STATES PATENTS

| | | | |
|---|---|---|---|
| 353,428 | 11/86 | Purson | 168—2 |
| 601,974 | 4/98 | Meissner | 119—1 |
| 1,087,054 | 2/14 | Tipper | 168—2 |
| 2,228,698 | 1/41 | Fitches | 119—1 |
| 2,793,640 | 5/57 | Schwartz | 128—66 |
| 3,027,568 | 4/62 | Blau et al. | 128—370 |
| 3,060,892 | 10/62 | Schantz | 119—158 |

SAMUEL KOREN, *Primary Examiner.*

ALDRICH F. MEDBERY, *Examiner.*